No. 782,510. PATENTED FEB. 14, 1905.
E. R. MALMBORG.
POSTMARKING AND CANCELING MACHINE.
APPLICATION FILED AUG. 9, 1902.

No. 782,510. PATENTED FEB. 14, 1905.
E. R. MALMBORG.
POSTMARKING AND CANCELING MACHINE.
APPLICATION FILED AUG. 9, 1902.

Witnesses:
David H. Fletcher.
Theodore F. Lawrence

Inventor:
Ernst R. Malmborg
By
W. R. Martindale
Attorney.

No. 782,510. PATENTED FEB. 14, 1905.
E. R. MALMBORG.
POSTMARKING AND CANCELING MACHINE.
APPLICATION FILED AUG. 9, 1902.

Witnesses:

Inventor:
Ernst R. Malmborg
By W. H. Martindale
Attorney.

No. 782,510. PATENTED FEB. 14, 1905.
E. R. MALMBORG.
POSTMARKING AND CANCELING MACHINE.
APPLICATION FILED AUG. 9, 1902.

Witnesses:
David H. Fletcher.
Theodor F. Lammer

Inventor:
Ernst R. Malmborg
By
W. R. Martindale
Attorney.

No. 782,510. PATENTED FEB. 14, 1905.
E. R. MALMBORG.
POSTMARKING AND CANCELING MACHINE.
APPLICATION FILED AUG. 9, 1902.

Witnesses:
David H. Fletcher
Thurston F. Lamman

Inventor:
Ernst R. Malmborg
By W. H. Martindale
Attorney.

No. 782,510. PATENTED FEB. 14, 1905.
E. R. MALMBORG.
POSTMARKING AND CANCELING MACHINE.
APPLICATION FILED AUG. 9, 1902.

Witnesses:
David H. Fletcher.
Theodore F. Lawrence

Inventor:
Ernst R. Malmborg
By
W. B. Martindale
Attorney.

No. 782,510. PATENTED FEB. 14, 1905.
E. R. MALMBORG.
POSTMARKING AND CANCELING MACHINE.
APPLICATION FILED AUG. 9, 1902.

Witnesses:
David H. Fletcher.
Theodore F. Lawrence

Inventor:
Ernst R. Malmborg
By W. B. Martindale
Attorney

No. 782,510. PATENTED FEB. 14, 1905.
E. R. MALMBORG.
POSTMARKING AND CANCELING MACHINE.
APPLICATION FILED AUG. 9, 1902.

Witnesses:

Inventor:
Ernest R. Malmborg
By
W. R. Martindale
Attorney.

No. 782,510. Patented February 14, 1905.

UNITED STATES PATENT OFFICE.

ERNST R. MALMBORG, OF CHICAGO, ILLINOIS, ASSIGNOR, BY MESNE ASSIGNMENTS, TO TIME MARKING MACHINE COMPANY, A CORPORATION OF THE DISTRICT OF COLUMBIA.

POSTMARKING AND CANCELING MACHINE.

SPECIFICATION forming part of Letters Patent No. 782,510, dated February 14, 1905.

Application filed August 9, 1902. Serial No. 119,033.

*To all whom it may concern:*

Be it known that I, ERNST R. MALMBORG, a citizen of the United States, residing at Chicago, in the county of Cook and State of Illinois, have invented certain new and useful Improvements in Postmarking and Canceling Machines, of which the following is a specification, reference being had to the accompanying drawings.

My invention relates to machines for postmarking letter mail and canceling the stamps thereon, and has for its object the production of a machine adapted for handling both faced and unfaced mail—that is to say, mail that has been arranged in bunches with the stamps all in one position and mail that has not been so arranged.

My present invention consists in an improved construction and arrangement of the machine described in Letters Patent No. 615,031, granted to me November 29, 1898, which said improvements will be fully described.

In the accompanying drawings.

Similar characters of reference indicate corresponding parts in each of the figures.

This machine consists of a feed mechanism, a printing mechanism, and a stacking mechanism, all of which coact together to produce one general result.

I will first describe the general arangement of the machine, after which I will more particularly describe the construction and operation of the distinctive parts referred to.

Figure 1:
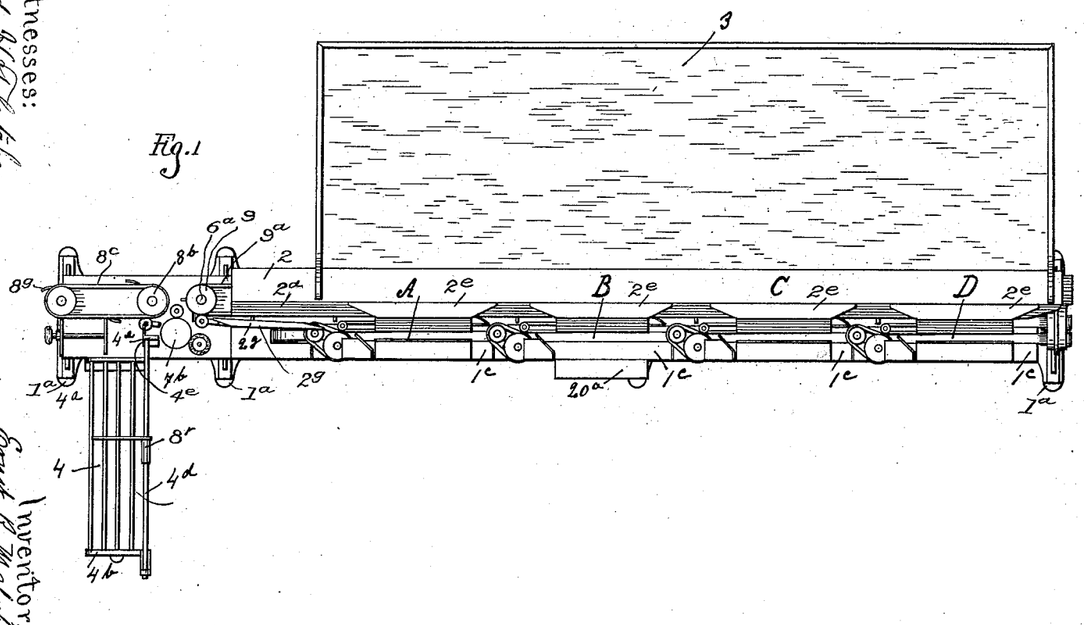
Figure 1 is a plan view of my improved machine.

Having reference to Fig. 1, that portion at the bottom of the sheet may properly be termed the "front end" or "head" of the machine. Beginning at this end we first have the stacking mechanism; second, the printing mechanism; third, the feed mechanism. The latter consists of the feed-belts, the timing-belt, and four feed-hoppers designated as A, B, C, and D. Each of the latter are similarly constructed.

In operating this machine the mail is placed on the table and then fed into the hoppers. If the mail has already been faced and bunched, however, one of the hoppers may be opened out and set to operate at the fast speed, an example of which is shown at B, Fig. 2. The bunches of letters being placed on the table formed by the hopper in this position are separated and fed to the printing mechanism at the rate of one for each revolution of the printing-cylinder. If the mail has not been previously faced and bunched, the hoppers A, B, C, and D are closed, as shown in A, C, and D, and set to operate at the slow speed. The mail-pieces are then fed into all four of the hoppers at the same time, from which they are delivered onto the general feed-belt in the proper order to be delivered to the printing mechanism, one for each revolution of the printing-cylinder. From the printing mechanism the mail is delivered to the stacking mechanism, where it is stacked in proper order for removal.

Following out the general construction in detail, 1 is a frame consisting of a base 1ª, four standards $1^b$, and a top composed of iron slabs $1^c$, on which the moving parts are mounted.

Figure 7:
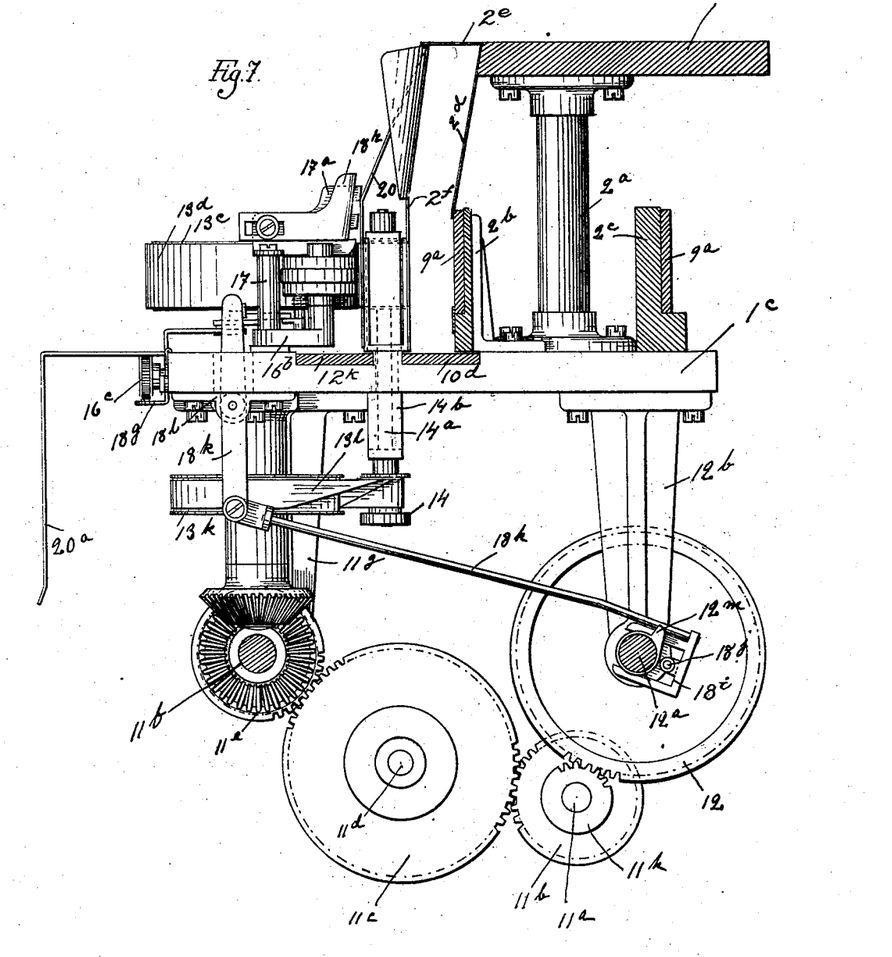
Fig. 7 is an enlarged cross-section in line *x x* of Fig. 6, taken in the direction of the arrows there shown, omitting the table.

2 is a shelf or narrow table supported by standards $2^a$, resting on the top of the frame 1, Fig. 7. $2^b$ and $2^c$, same figure, are guides or supports for the belt $9^a$ and are rigidly attached to the frame 1.

$2^d$ is a guide forming part of the inner wall of the runway for the letters. $2^e$ is a bridge or covering for said runway opposite each feed-hopper and extends from the table 2 to the inner side of each hopper.

$2^f$ is a guide forming the outer wall of the runway. That portion opposite the feed-hoppers extending higher than the other portion has its ends turned outward to prevent contact with the letters, Figs. 3 and 7.

Figure 2:
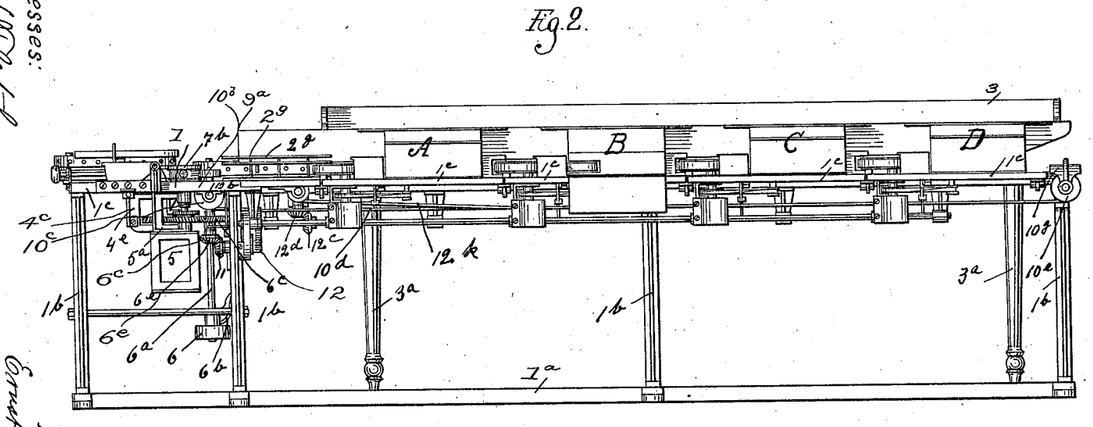
Fig. 2 is a side elevation of same from the right side of Fig. 1.

$2^g$ is an extension of the guide or side wall $2^f$, composed of strips of sheet-steel arranged horizontally with the edges forming the wall to the runway in order to reduce the friction, Figs. 1 and 2.

3 is a table supported on one side by legs $3^a$, the other side resting on the shelf 2.

4 is a table or support adapted to receive the stack of mail after it has been postmarked and canceled. It consists of metallic rods arranged parallel to each other on the same plane. The rods are held in place by two pieces $4^a$ and $4^b$, Fig. 1. $4^a$ is secured to the frame $1^c$ by means of screws.

Figure 3:
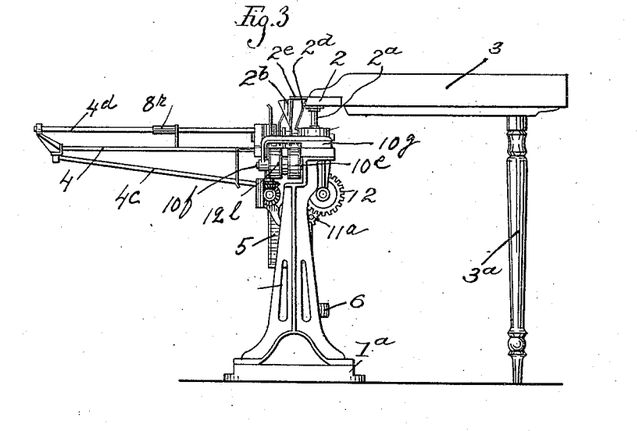
Fig. 3 is an end elevation from the rear.
Figure 4:
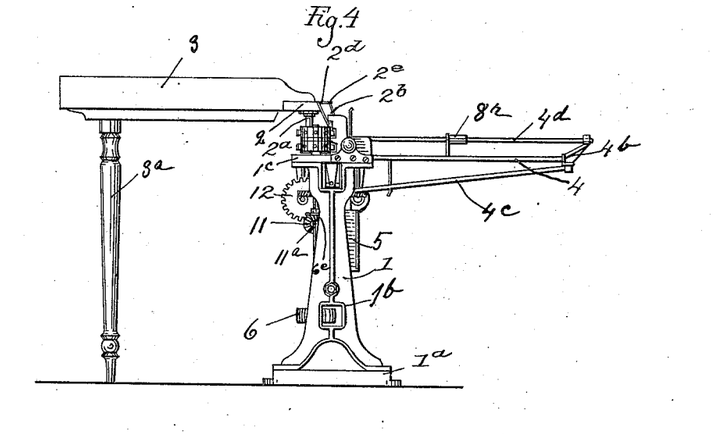
Fig. 4 is an elevation from the front end.

$4^c$ is a brace extending from the end piece $4^b$ to the frame 1, Figs. 2, 3, and 4.

$4^d$ is a rod supported by the end piece $4^b$ and bracket $4^e$. The latter is screwed to the frame $1^c$.

5 is a box or case adapted to contain time mechanism. It is supported by the bracket $5^a$, which is rigidly attached to the frame 1, Fig. 2.

The general construction and arrangement of the moving parts is as follows:

6 is the driving-pulley or prime motor and is keyed on a shaft $6^a$, which has one of its bearings in a bracket $6^b$ and the other in the top portion of the frame. On the shaft $6^a$ is keyed a gear $6^c$, which meshes with a gear 7, keyed to the shaft $7^a$, journaled in a bracket $5^a$, screwed on the frame $1^c$, which shaft carries the printing-cylinder $7^b$. Said gear 7 also meshes with a gear 8, keyed on the shaft $8^a$, which carries the driving-pulley $8^b$ of the stacking mechanism. Keyed on the upper end of shaft $6^a$ is the sprocket-pulley 9, which drives the sprocket-belt $9^a$, Figs. 1, 2, 7, 12, and 13. Said belt also passes around an idle pulley $9^b$ at the rear end of the machine, Fig. 3. Said pulley is journaled on a stud attached to the frame 1.

Figure 12:
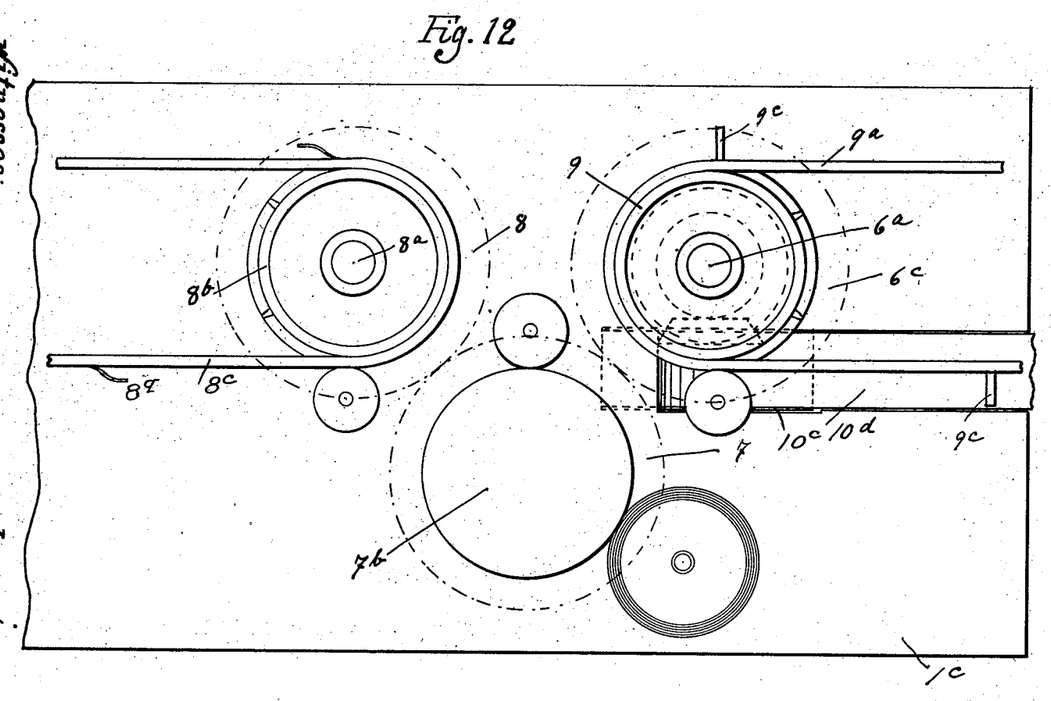
Fig. 12 is an enlarged plan view in detail of the printing mechanism and parts adjacent thereto, showing the gearing in dotted lines.
Figure 13:
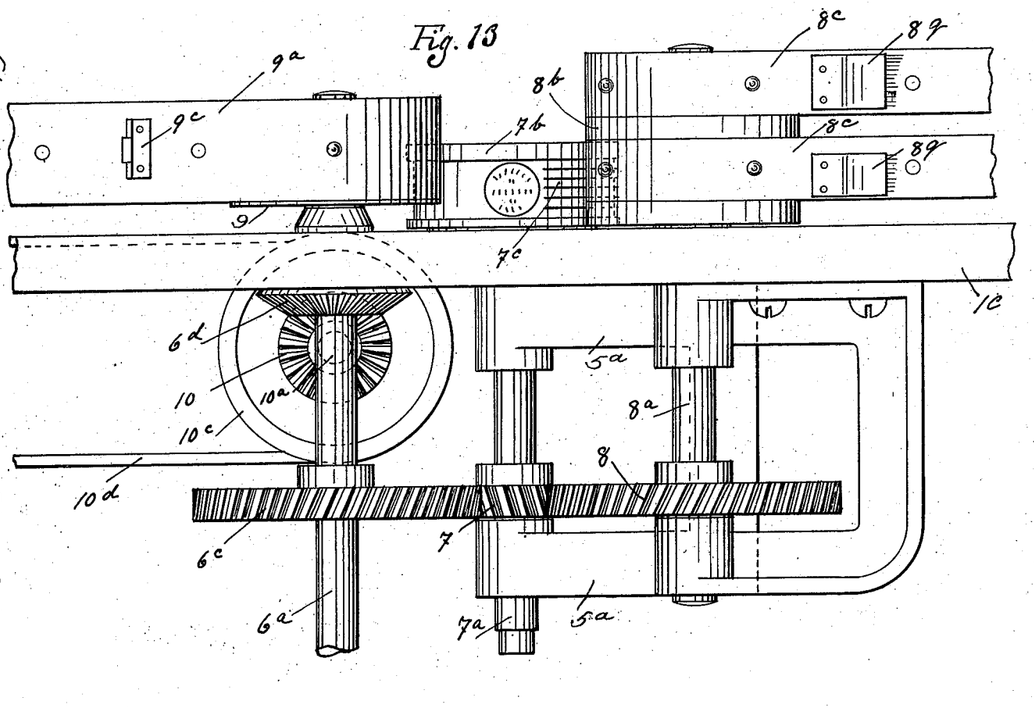
Fig. 13 is a side elevation of same from the left side.

Referring to Fig. 13, keyed on the driving-shaft $6^a$ is a beveled gear $6^d$, which meshes with a beveled gear 10, keyed on a shaft $10^a$, which has its bearings in a bracket $10^b$, bolted to the frame 1, Fig. 2. On the same shaft is keyed a pulley $10^c$, which drives the feed-belt $10^d$, Figs. 2, 3, 5, 7, 12, and 13. Said feed-belt also passes around an idle pulley $10^e$ at the rear end of the machine, Fig. 3, which pulley is journaled on a shaft $10^f$, supported by an adjustable bracket $10^g$, clamped on the frame 1, Figs. 2 and 3.

Figure 5:
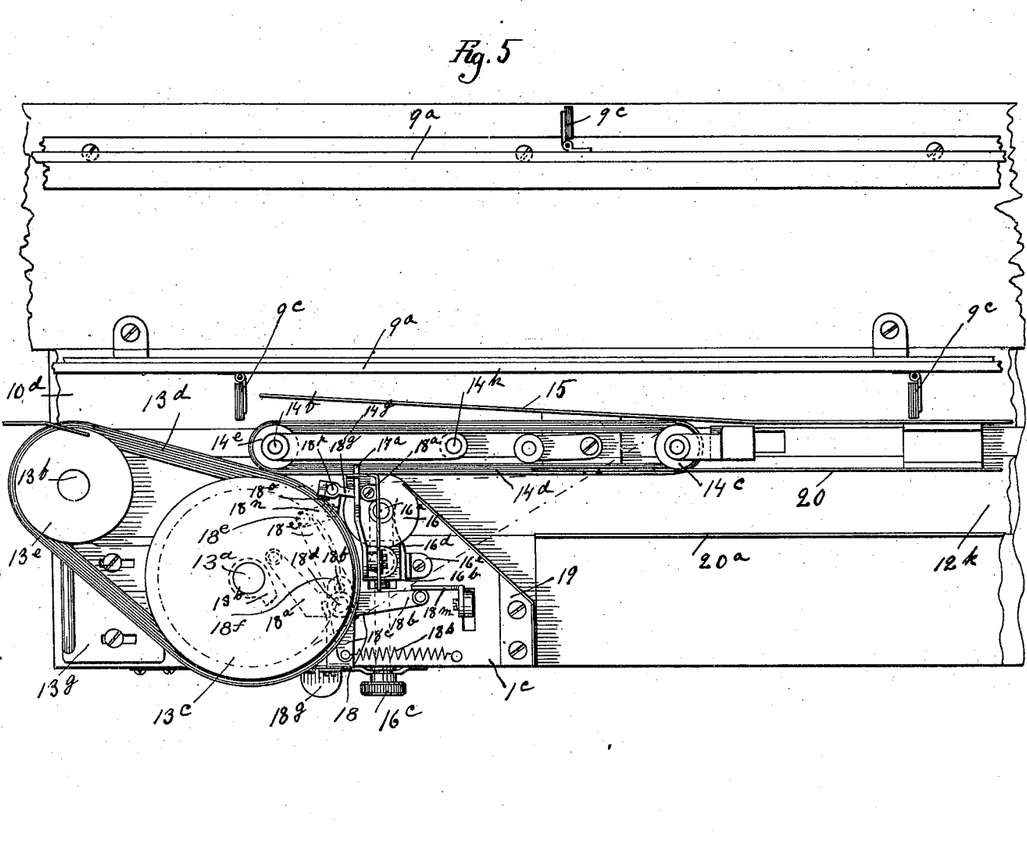
Fig. 5 is an enlarged detail plan view of one of the four feed-hoppers A, B, C, and D.

Keyed on the driving-shaft $6^a$ is a miter-gear $6^e$, which meshes with a gear 11, keyed on a shaft $11^a$, Figs. 4, 5, and 7, which has its bearings on the frame $1^b$, Fig. 2. Said shaft carries also a gear $11^b$, which meshes with a gear $11^c$, journaled on a stud $11^d$, attached to the frame $1^b$, Figs. 2 and 7. The gear $11^c$ also meshes with a gear $11^e$, keyed on a shaft $11^f$, which has its bearings in the hangers $11^g$, screwed on the frame $1^c$, Figs. 2, 6, and 7, which shaft $11^f$ constitutes the driving element of the feed-hoppers A, B, C, and D.

Figure 14:
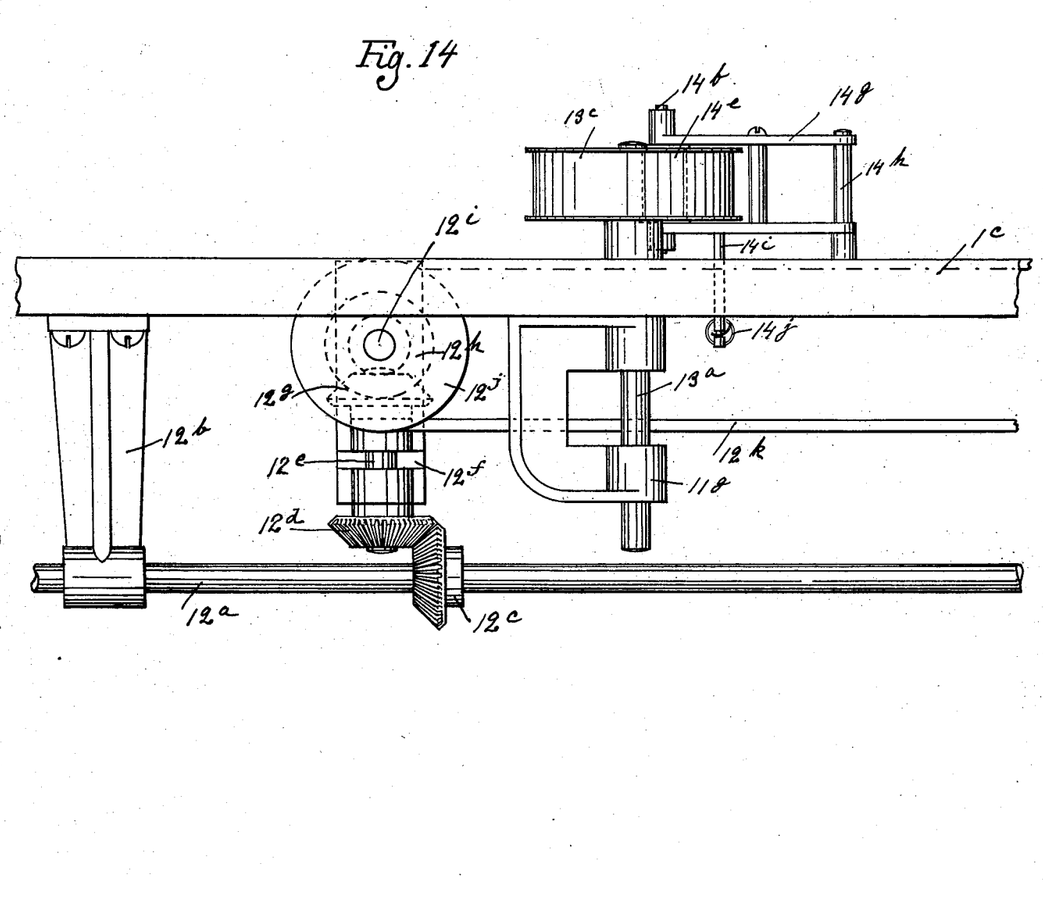
Fig. 14 is an enlarged side elevation in detail, showing the mechanism for driving the pulley which actuates the belt running beneath the feed-hoppers, also a detail of part of the mechanism of one of the feed-hoppers.

Keyed on the outer end of the shaft $11^a$ is a small gear $11^h$, which meshes with a gear 12, keyed on a shaft $12^a$, which has its bearings in the hangers $12^b$, screwed to the frame $1^c$, Figs. 7, 12, and 14. Also keyed on the shaft $12^a$ is a miter-gear $12^c$, which meshes with a gear $12^d$, keyed to a shaft $12^e$, which has its bearings in a bracket $12^f$, screwed to the frame $1^c$, Fig. 14. Keyed to the upper end of the shaft $12^e$ is a miter-gear $12^g$, which meshes with a gear $12^h$, keyed to a shaft $12^i$, which has its bearings in a bracket screwed to the frame $1^c$, Figs. 2 and 14. The shaft $12^i$ carries a pulley $12^j$, which drives the belt $12^k$, running in the bottom of the feed-hoppers A, B, C, and D. Said belt $12^k$ also passes over an idle pulley $12^l$, journaled on the shaft $10^f$ at the rear end of the machine, Fig. 3. The shaft $12^a$ also serves to actuate the timing mechanism of the feed-hoppers, as will be hereinafter more fully explained.

Having described the general construction of the driving mechanism, I will now proceed to a detailed description of one of the feed-hoppers A, B, C, and D.

Keyed on the shaft $11^f$, constituting the main driving element of said hoppers, is a miter-gear $11^i$, which meshes with a gear 13, keyed on the shaft $13^a$, which has its bearings in one of the hangers $11^g$. On the upper end of said shaft $13^a$ is keyed a flanged pulley $13^c$, on which is mounted a friction-belt $13^d$. Said belt also passes over a flanged idle pulley $13^e$, journaled on a stud $13^f$, supported by an adjustable bracket $13^g$, clamped on the frame $1^c$, Figs. 5 and 6. Also keyed on the shaft $13^a$ is a flanged pulley $13^k$, which carries the belt $13^l$, which passes around a driving-pulley 14, keyed to the shaft $14^a$, which shaft has its bearings in a bracket $14^b$, extending upward through a slot in the frame $1^c$ and adjustably clamped thereto, Figs. 6 and 7. Keyed on the shaft $14^a$ is a pulley $14^c$, which drives the friction-belt $14^d$, said belt passing around another pulley $14^e$, journaled on a shaft $14^f$, supported in a frame $14^g$. Said frame is pivoted on a stud $14^h$, screw-threaded in the frame 1$^c$, Figs. 5 and 14. The frame 14$^g$ also has a stud 14$^i$, extending downward through a slot in the frame 1$^c$. Attached to the lower end of said stud is a coiled spring 14$^j$. The opposite end of said spring is attached to a pin in the frame 1$^c$. The stress of said spring is applied to press the belt 14$^d$ against the belt 13$^d$ in order to grasp the mail-pieces fed between them and carry the same forward, the belt 13$^d$ acting as a guide to direct said pieces onto the main feed-belt 10$^d$, Fig. 5.

15 is a guide adapted to shunt the passing mail-pieces over against the belt 9$^a$ and prevent their falling into the open space in the side wall of the runway, occurring between the rollers 13$^e$ and 14$^e$, Fig. 5.

Mounted against the friction-belt 13$^d$ and roller 13$^c$ is a friction-roller 16, journaled on a stud 16$^a$, supported by an adjustable slide 16$^b$. Said slide is loosely fitted to a slot in the frame 1$^c$ and adapted to be moved back and forth by turning the set-screw 16$^c$ to the right or left.

Figure 6:
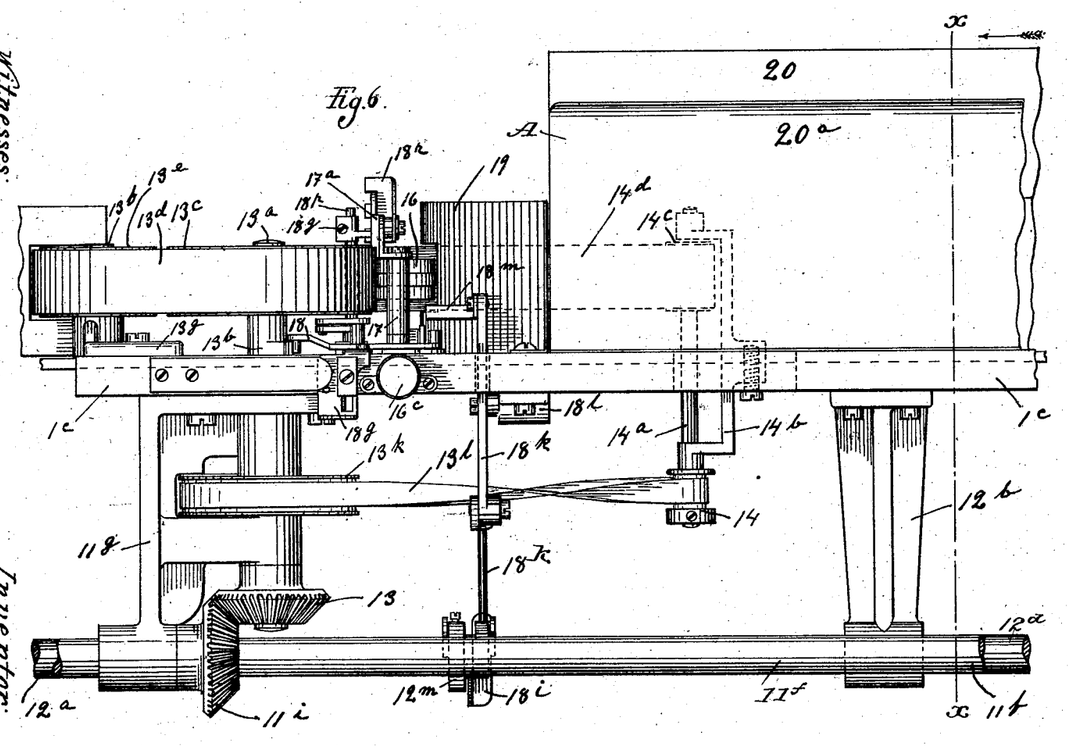
Fig. 6 is a side elevation of same.

16$^d$ is a flat spring mounted on a lug 16$^e$, screwed to the frame 1$^c$, Figs. 5 and 6.

17 is a stud mounted on the slide 16$^b$, on top of which stud is screwed a stop 17$^a$. The opposite end of said stop extends into the pathway of mail-pieces being fed between the friction-belt 14$^d$ and roller 16 and stops them from passing until they are released therefrom by the timing mechanism, which I will next describe.

Secured to the shaft 13$^a$ is a cam 13$^b$, Figs. 5 and 6, adapted to engage with a lever 18, said lever having three arms 18$^a$, 18$^b$, and 18$^c$, constituting one piece. It is loosely mounted on a revoluble shaft 18$^d$, which has its bearing in the frame 1$^c$. A fourth arm 18$^e$ is rigidly attached to said shaft 18$^d$ at the upper end thereof. The arm 18$^e$ has a pin 18$^f$ riveted therein, extending downward through a hole in the lever 18, the purpose of said pin being to permit the lever 18 to be moved up and down on the shaft 18$^d$ and pin 18$^f$, while the arm 18$^e$ will be actuated by movements thereof in position for either the slow or fast speed, as will hereinafter be more fully explained.

18$^g$ is an adjustable support for the lever 18 and is adapted to be raised and lowered at the will of the operator to adjust the lever 18 in position to be actuated either by the cam 13$^b$ or by the means which I will now proceed to describe.

Keyed to the shaft 12$^a$, Figs. 6 and 7, is a cam 12$^m$, which actuates a pitman 18$^h$, the end of which pitman has a U-shaped bearing 18$^i$, which hooks over the shaft 12$^a$ and is provided with an antifriction-roller 18$^j$ to lessen the friction on the cam 12$^m$. The opposite end of the pitman 18$^h$ is pivoted on a lever 18$^k$, which lever is pivoted substantially at its center on a lug 18$^l$, screwed on the frame 1$^c$, Fig. 7.

The lever 18$^k$ passes up through a slot in the frame 1$^c$ and is provided at its upper end with an arm 18$^m$, adapted to engage the arm 18$^b$ of the lever 18 when in its highest position. The first-described mechanism actuates said lever when in its lowest position at a speed equal to one stroke for each revolution of the printing-cylinder. The last-described mechanism operates at one-fourth that speed.

Pivoted on the outer end of the arm 18$^e$ is a link 18$^n$, pivoted at its opposite end on an arm 18$^o$, attached to a revoluble shaft 18$^p$, which has its bearing in the frame 1$^c$, Figs. 5 and 6. Secured to the upper end of the shaft 18$^p$ is an arm 18$^q$, which extends through a slot in the stop 17$^a$ and is pivoted on a sliding throw-off 18$^r$ for releasing the mail-pieces from said stop 17$^a$.

Hooked on a pin in the outer end of the arm 18$^c$ is a coil-spring 18$^s$, the other end of which is hooked on a pin in the frame 1$^c$. The purpose of said spring is to retract the lever 18 when actuated by the cam 13$^b$ or the arm 18$^m$.

19 is a guide for directing the mail-pieces to the feeding mechanism described.

20 is the inner wall of the hopper, and 20$^a$ the outer wall of the same, Figs. 5 and 7. The latter is hinged on the frame 1$^c$ and may be folded down, as shown in the hopper B, Figs. 1, 2, 5, 6, and 7.

The operation of this mechanism is as follows: The mail being placed on the table 3 is fed to the machine by one or more feeders standing on the right-hand side of the machine. If the mail-pieces have previously been faced and bunched, only one feeder is required, using but one of the feed-hoppers set at the fast speed. If the mail is unfaced, it may be fed into each of the four hoppers at the same time by four feeders, the timing mechanism of the feed-hoppers being set at the slow speed. In the latter case the mail-pieces may be fed either one at a time or in bunches, but the letters must all be fed with the stamps in position to be canceled by the marking-die—that is to say, at the forward end and in the lower corner of the envelop facing toward the feeder. The letters having been placed in the hopper the belt 12$^k$, moving in the bottom of the hopper, carries the pieces up against the guide 19, which arranges them in position to be separated and fed one at a time, directing them in that position toward the outlet of the hopper, the pieces nearest the belt 14$^d$ being slightly in advance of the others in order of arrangement. The piece next to the friction-belt 14$^d$ is acted upon by friction therewith and carried forward, while the remaining pieces, coming in contact with the reverse-roller 16, are held back, the one next to the belt 14$^d$ being carried up to the top 17$^a$, where it remains until freed therefrom by the throw-off 18$^r$, which pushes it over past the end of said stop 17$^a$, when it is free to pass on. The next in succession assuming the same position is acted upon in the same manner, whereby the escape of each piece is timed. The timing throw-off $18^r$ being geared in unison with the sprocket-belt $9^a$ each letter is delivered between the belts $13^d$ and $14^d$ and guided by the belt $13^d$ onto the main feed-belt $10^d$ immediately behind one of the retarders $9^c$. This is accomplished by setting the two rear hoppers a quarter-revolution in advance of the two in front. The belt $10^d$, traveling at a greater speed than the belt $9^a$, carries a letter up against the retarder $9^c$, traveling in front of it, and holds it in that position until it reaches the printing mechanism, where it is thereby delivered at the proper time for the canceling-die to register on the stamp. The stops or retarders $9^c$ are hinged on the belt $9^a$ with spring-hinges, which cause them to stand normally at right angles with said belt, but admits of their giving back in case of meeting an obstruction, immediately assuming their normal position when the obstruction has been passed.

It should be observed that when the mail has been previously faced and bunched one of the feed-hoppers may be opened out as shown at B and the timing feed mechanism set on the fast speed, when a bunch of mail may be placed against the friction-belt $14^d$, where it will be separated and fed, one piece at a time, at the rate of one for each revolution of the printing-cylinder, one piece being delivered to the main feed-belt behind each one of the retarders $9^c$. When set on the slow speed, the letters are delivered from each of the four feed-hoppers at one-fourth that speed, whereby one is delivered immediately behind each of the retarders $9^c$, arriving at the printing mechanism in time for the die to register upon the stamps—that is to say, the four hoppers running at slow speed will feed one piece for each revolution of the printing-cylinder the same as one hopper at the fast speed.

Figure 8:
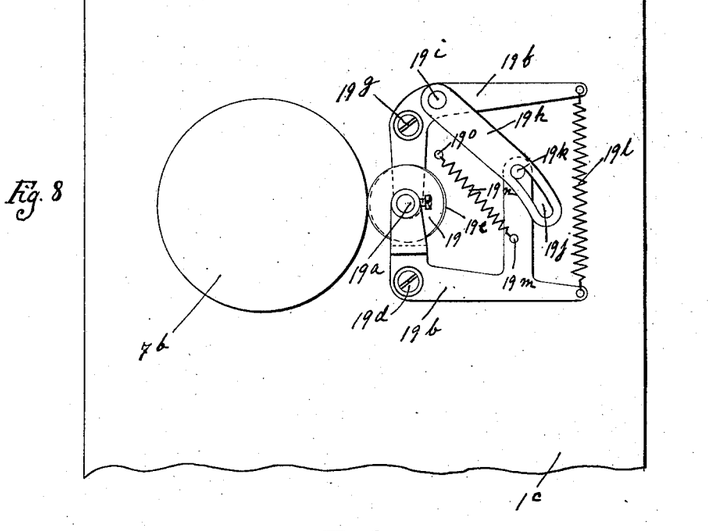
Fig. 8 is an enlarged plan view of my improved printing mechanism.
Figure 9:
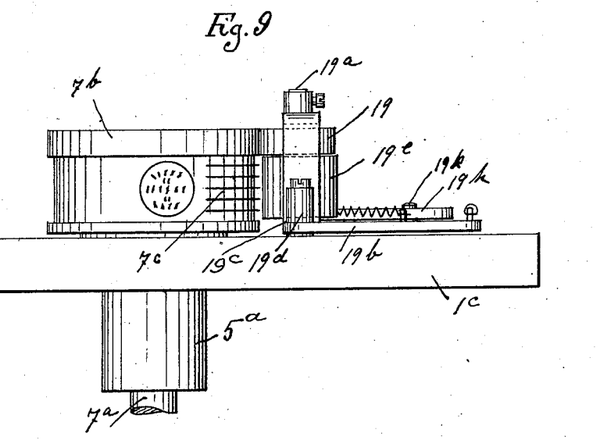
Fig. 9 is a side elevation of same.

Referring to Figs. 8 and 9, 19 is a roller yieldingly mounted against the printing-cylinder $7^b$, at the upper edge thereof, said cylinder carrying the die $7^c$. The roller 19 is journaled on a stud $19^c$, screwed by a set-screw to the upper end of the arm $19^b$, which arm is pivoted on the frame $1^e$ at $19^d$. $19^e$ is an impression-roller journaled on a stud in the arm $19^f$, which arm is pivoted on the frame $1^e$ at $19^g$. $19^h$ is a cross-arm pivoted on the arm $19^f$ at $19^i$. Said arm $19^h$ is provided with a slot $19^j$, adapted to receive a pin $19^k$ in the arm $19^b$. Hooked on the outer ends of the levers $19^b$ and $19^f$ is a coil-spring $19^l$, the stress of which tends to draw the ends of said arms together. Hooked on the arm $19^b$ at $19^m$ is another coil-spring $19^n$, the opposite end of which is hooked on a pin $19^o$ in the frame $1^c$. The operation of this mechanism is as follows:

It is obvious that the arms $19^b$ and $19^f$, one bearing the roller 19 and the other the roller $19^e$, being of equal length and connected by the spring $19^l$, would without other mechanism cause both rollers to press with equal force against the impression-roller. It is essential, however, that the roller $19^e$ should be kept out of contact with the impression-roller except during the passage of a mail-piece. This result is accomplished by means of the spring $19^n$ in conjunction with the pin $19^k$ and slotted cross-arm $19^h$. Said parts are so adjusted with reference to each other that when the roller 19 is in contact with the roller $7^b$ the pin $19^k$ presses against the inner end of the slot $19^j$ by reason of the action of the spring $19^n$, thereby forcing that part of the arm $19^f$ to which the spring $19^l$ is attached back, the spring $19^n$ tending to move the ends of both the arms $19^b$ $19^f$ to which the spring $19^l$ is attached in the same direction, thus moving the rollers upon the opposite ends of said bent arms in opposite directions. The extent of this movement is limited by the positive contact of the roller 19 with the roller $7^b$. As soon, however, as a mail-piece intervenes it presses the roller 19 in an opposite direction against the action of both springs, at the same time moving the pin $19^k$ forward in the slot, which leaves the arm $19^f$ free to be moved by the spring $19^l$, the tension of which serves to move the impression-roller against the printing-die or, rather against the intervening mail-piece, where it remains until the passage of said piece enables the spring $19^n$ to restore the parts to their normal position by pushing the pin $19^k$ against the end of said slot, and thus moving the arm $19^f$ back against the action of the spring $19^l$. It is to be observed that both the rollers 19 and $19^e$ are yieldingly mounted to permit of the passage of mail-pieces of different thicknesses. As soon as a mail-piece has passed the roller 19 drops back against the rim of the printing-cylinder $7^b$, and the arm $19^b$ assuming its normal position the  id $19^k$ acting on the arm $19^h$ causes the arm $19^f$ to be forced back to its normal position, in which position the impression-roller $19^e$ is held out of contact with the printing-cylinder to prevent its becoming inked by the printing-die, the mechanism remaining in this position until another mail-piece is fed, when the same operation is performed.

Figure 10:
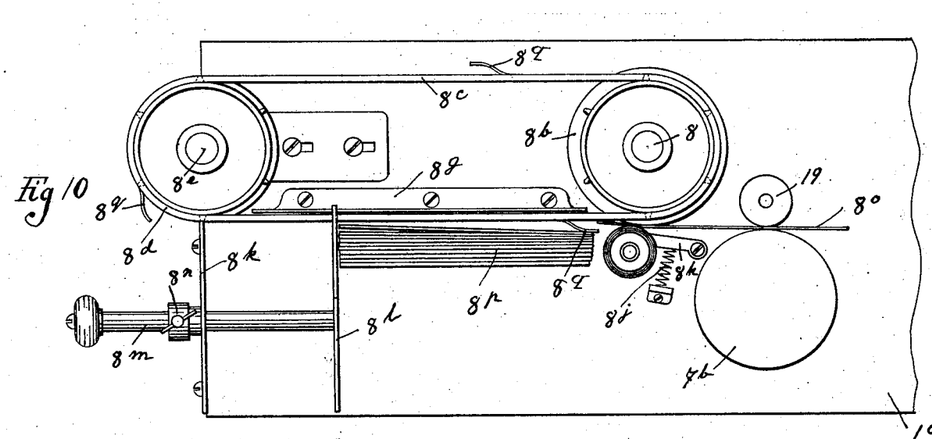
Fig. 10 is an enlarged plan view of my improved stacking mechanism.
Figure 11:
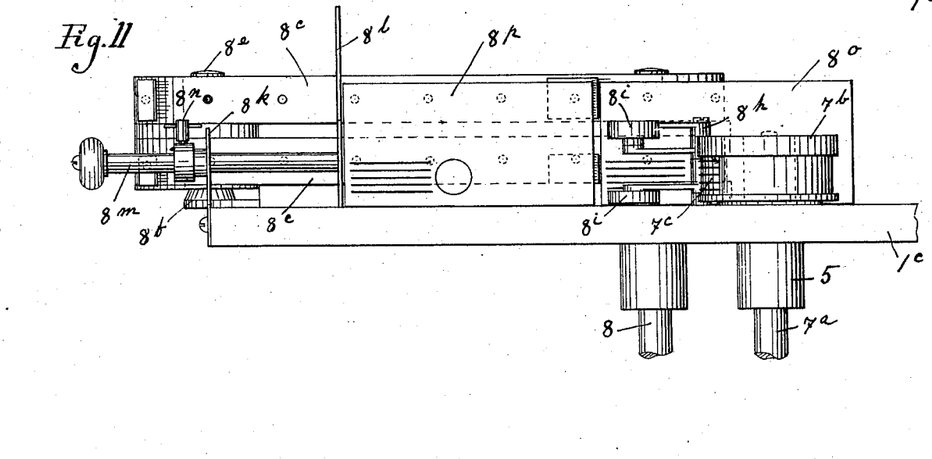
Fig. 11 is a side elevation of same.

I will now proceed to describe my improved stacking mechanism. (Shown in Figs. 10 and 11.) The driving-pulley $8^b$ is constructed with a raised or flange portion in its center and at the bottom and two sets of sprocket-pins for carrying two belts $8^c$, which belts are provided with outwardly-extending ears or flanges $8^a$, Figs. 10 and 11. The belts $8^c$ also pass around an idle pulley $8^d$ of similar construction to the pulley $8^b$. Said pulley $8^d$ is journaled on a stud $8^e$, supported by an adjustable bracket $8^f$, screwed on the frame $1^e$. On the inner right-hand side of the belts $8^c$ is a support or backing $8^g$ to prevent said belts from giving back by the pressure from the stack of letters. Pivoted on the frame 1$^c$ are two arms 8$^h$, on the opposite ends of which are journaled two rollers 8$^i$, which are pressed against the raised portions or flanges of the pulley 8$^b$ by a coil-spring 8$^j$. 8$^k$ is the end wall or abutment for the mail-pieces, which abutment is screwed to the frame 1$^c$. 8$^l$ is an adjustable stop consisting of a plate having a rod 8$^m$ securely attached thereto, which rod extends through the end wall 8$^k$ and is adjustably secured thereto by means of a set-screw 8$^n$. 8$^o$ is a letter in the act of passing from the printing mechanism into the stacking mechanism. 8$^p$ is a stack of letters. 8$^r$, Figs. 3 and 4 is a movable back-support for the stack of letters loosely mounted on the rod 4$^d$. The operation of this mechanism is as follows: The stacking mechanism and printing mechanism being geared together and properly adjusted, a mail-piece, after having been postmarked and canceled, is delivered from the printing mechanism to the stacking mechanism between the pulley 8$^b$ and rollers 8$^i$ immediately behind two of the flanges 8$^q$ on the belts 8$^c$ and is carried forward in that position until it encounters the stop 8$^l$, where it is stopped, and the next set of flanges 8$^q$ coming behind it pushes it from the pathway, adding it to the stack and making room for the next, when the same operation is performed. The back-support 8$^r$ readily yields to the pressure and moves back as the stack increases until it reaches the end and the table is filled, when the stack is removed and the support moved up for the beginning of a new stack.

Having fully described my invention, what I claim is—

1. The combination of a conveying-belt, a series of hoppers or receptacles for articles to be conveyed, said conveying-belt and the bottom of said hoppers being arranged in substantially the same plane, and means for directing and delivering the articles to be conveyed from said hoppers to and upon said conveying-belt.

2. The combination with a chute or runway, of a conveying-belt arranged to move in the bottom thereof, a series of hoppers or receptacles for articles to be conveyed arranged in juxtaposition to said chute, the bottoms thereof being in substantially the same plane with said conveying-belt, and means for directing and delivering the articles to be conveyed from said hoppers into said chute.

3. The combination with a chute or runway, of a series of hoppers or receptacles for articles to be carried arranged adjacent thereto, means continuously moving in the bottom of said hoppers for conveying said articles, and means for shunting the same from said hoppers into said chute.

4. In a postmarking and canceling machine, the combination with the printing mechanism, of stacking mechanism consisting of a belt mounted on revoluble pulleys having one of its peripheral surfaces between said pulleys arranged along the pathway of the mail-pieces to be stacked, said belt being provided with outwardly-extending flanges arranged to traverse the pathway of said mail-pieces.

5. In a postmarking and canceling machine, the combination with the printing mechanism, of a belt mounted on revoluble pulleys, said belt having outwardly-extended flanges arranged to intersect the pathway of the marked mail-pieces, and a stop for said mail-pieces arranged across said pathway.

6. In a postmarking and canceling machine, the combination with the printing mechanism of a belt mounted on revoluble pulleys having outwardly-extending flanges arranged to traverse the pathway of the marked mail-pieces, and a roller yieldingly mounted against said belt adjacent to said printing mechanism.

7. In a mail marking and canceling machine the combination with the printing mechanism of a belt mounted on revoluble pulleys and having outwardly-extending flanges arranged to traverse the pathway of the marked mail-pieces and a support for the stack of marked mail.

8. In a mail-marking machine, the combination with the printing mechanism, of a stacking mechanism consisting of a belt mounted on revoluble pulleys, and having outwardly-extending flanges arranged to traverse the pathway of the marked mail-pieces, a bisected roller yieldingly mounted against said belt adjacent to the printing mechanism, an adjustable stop arranged across the pathway of the mail-pieces, and a table or support to receive the stack of mail.

9. In a postmarking and canceling machine, the combination with the printing mechanism, of a sprocket-belt mounted on revoluble sprocket-pulleys, said pulleys being geared with the printing mechanism, a series of outwardly-extended flanges on said belt arranged to intersect the pathway of the mail-pieces at suitable intervals whereby said mail-pieces are consecutively removed from said pathway.

10. In a postmarking and canceling machine, the combination with the printing mechanism, of a sprocket-belt mounted on revoluble sprocket-pulleys geared with the printing mechanism, a series of outwardly-extended flanges on said belt arranged to traverse the pathway of the marked mail-pieces and a stop for said mail-pieces arranged across their pathway, said flanges being so arranged and timed that each mail-piece will travel behind one of the flanges until intercepted by said stop, when the next succeeding flange will enter behind it, push it from said pathway and add it to the stack.

11. In a mail-marking machine, the combination with a printing mechanism, of feed mechanism consisting of a continuously-moving feed-belt, and adjacent belt moving at a slower speed timed with the printing mechanism and yielding stop-fingers mounted thereon.

12. In a feed mechanism the combination with a continuously-moving feed-belt, of a belt mounted on revoluble pulleys and having one of its peripheral surfaces between said pulleys, arranged to act as a guide for the delivery of the mail-pieces onto said feed-belt.

13. In a feed mechanism, the combination with a continuously-moving feed-belt and a timing-belt adjacent thereto moving at a slower speed, having stops or retarding-fingers mounted thereon, of a guide-belt arranged to guide the articles being fed onto said feed-belt, said guide-belt being timed with the aforesaid timing-belt.

14. The combination in a feed mechanism of a guide-belt mounted on revoluble cylinders, with a friction-belt mounted on revoluble pulleys or rollers, one of said rollers carrying said friction-belt yieldingly mounted against one of the cylinders carrying said guide-belt, and means for timing the admission of articles being fed between said roller and cylinder.

15. The combination with a continuously-revolving cylinder, and a friction-roller revolving in the opposite direction, of a friction-belt mounted adjacent to said roller on revoluble pulleys, one of which is yieldingly mounted against said cylinder and means connected with said cylinder for timing the admission of articles being fed between said friction-belt and cylinder.

16. In a feeding mechanism the combination with a continuously-revolving cylinder, of a friction-roller mounted against said cylinder, a friction-belt mounted adjacent to the peripheral faces of said cylinder and roller and means connected with said cylinder of timing the admission of articles being fed between said friction-belt and said cylinder.

17. The combination in a feed mechanism of a continuously-revolving cylinder, a friction-roller mounted against said cylinder, a friction-belt mounted against the peripheral faces of said cylinder and roller, and a timing-finger adapted to move into and out of the pathway of articles being fed, governed by a cam on the shaft of said cylinder.

18. In a feed mechanism, the combination with a revoluble cylinder, of a friction-roller revolving in the opposite direction thereto, a friction-belt traveling with said cylinder yieldingly mounted against the peripheral faces of said cylinder and roller, timing mechanism connected with said cylinder, and means for changing the speed of said timing mechanism with respect to the speed of said cylinder.

19. In a feed mechanism, the combination with a revoluble cylinder, of a friction-roller adjacent thereto revolving in the opposite direction, a friction-belt yieldingly mounted against the peripheral faces of said cylinder and reverse-roller, timing mechanism connected with said cylinder and a belt traveling beneath said mechanism on which the articles to be fed are placed.

20. The combination with a chute or runway of a series of hoppers or receptacles for articles to be conveyed adjacent thereto, means for conveying said articles from said hoppers into and along said chute and a guide or shield arranged within said chute in front of said hoppers.

In witness whereof I have hereunto subscribed my name, at Chicago, in the county of Cook and State of Illinois, this 31st day of July, 1902.

ERNST R. MALMBORG.

In presence of—
B. F. CUMMINS,
J. J. HAZEN.